(No Model.)
C. CROISSANT & P. P. HURE.
DRILL CHUCK.
No. 248,088. Patented Oct. 11, 1881.
FIG. 1.
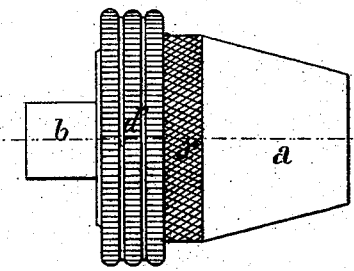
FIG. 2.
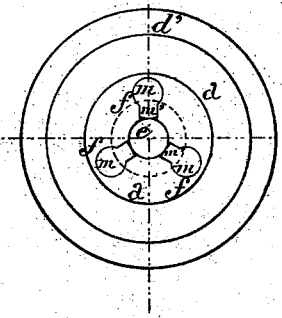
FIG. 3.
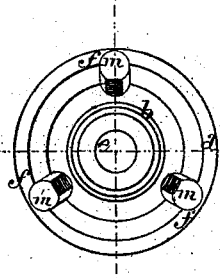
FIG. 4.
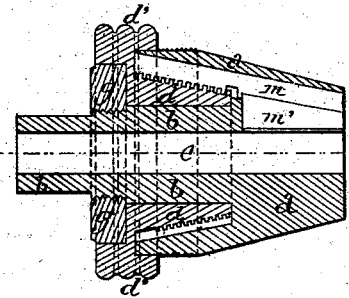
FIG. 5.
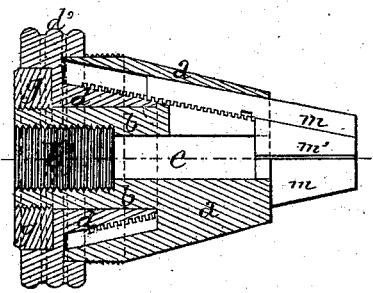
FIG. 6.
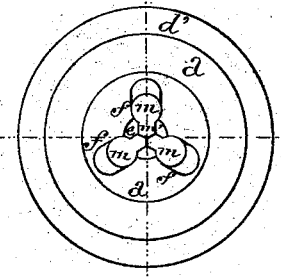
FIG. 7.
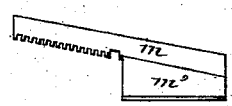
FIG. 8.

UNITED STATES PATENT OFFICE.

CHARLES CROISSANT AND PIERRE PHILIPPE HURÉ, OF PARIS, FRANCE.

DRILL-CHUCK.

SPECIFICATION forming part of Letters Patent No. 248,088, dated October 11, 1881.

Application filed June 6, 1881. (No model.) Patented in France April 23, 1881.

*To all whom it may concern:*

Be it known that we, CHARLES CROISSANT and PIERRE PHILIPPE HURÉ, of Paris, in the Republic of France, have invented a Drill-Chuck, (for which we have obtained Letters Patent of France for fifteen years, dated April 23, 1881, and numbered 142,484;) and we do hereby declare that the following is a full and exact description thereof, reference being made to the accompanying drawings.

Our improved chuck is constructed with sliding jaws set into converging grooves and geared on their inner edges into a conical screw, which is properly swiveled in the body of the chuck.

In the center the chuck is perforated with a hole equal to the largest diameter which can be clamped. The chuck may be set on the head of a lathe or fitted upon the spindle of a boring or shaping machine, &c.

In our improved chuck none of the operating parts are visible externally, all being concealed, and thereby protected against dust, &c. The jaws have angular biting-edges always parallel to the axis of the chuck, so that they will act uniformly and in a parallel line on the piece which is to be held.

In the drawings forming part of this specification, Figure 1 is a side view; Fig 2, an end view of our improved chuck. Fig. 3 is a back view of the chuck when the screw is taken off. Fig. 4 is a central longitudinal section of the chuck. Fig. 5 is a central longitudinal section of a modified form of the chuck; Fig. 6, an end view thereof. Figs. 7 and 8 show detail views of one of the jaws.

The body $a$ of the mandrel is of truncated conical form, perforated centrally and provided with a backwardly-projecting tubular socket, $b$, at its broader end. This socket has a screw-thread at its projecting end. Between the socket $b$ and the outer periphery of body $a$ there is a tapering groove in the back of the body $a$, adapted to receive a tapering screw, $d$. This screw $d$ has an outwardly-extending rim and collar, $d'$, which embraces the larger end of the body $a$, as shown. The body $a$ has three inclined channels, $f$, all converging toward the small end of the said body. Into each of these channels is fitted a jaw, $m$.

Above the screw $d$ the body $a$ is solid, excepting the central hole. The channels $f$ are circular in cross-section, like the bodies of the jaws, and communicate with the central passage, $e$, by means of grooves with parallel sides, into which the plain and clamping parts $m'$ of the aforesaid jaws fit. Each jaw $m$ has at its lower inner side a thread matching that of the screw $d$, so that all the jaws can be simultaneously moved either forward or backward.

The screw $d$, which turns on the socket $b$, is maintained in place and clamped by a nut, $g$, screwed on the threaded socket $b$. The projections $m'$ on the jaws $m$ have biting-edges parallel to the axis of the chuck.

The chuck having been secured on the lathe or other machine, it is sufficient to turn the screw $d$ from right to left in order to move the jaws out and to produce the clamping action on the piece to be held.

The modification shown in Figs. 5 and 6 is only different from the construction shown in the other figures in having the inner side of socket $b$ threaded for convenient attachment to a suitable spindle.

When necessary to protect the piece which is to be clamped, special jaws, fitted with copper or other suitable metal at the biting-edges, may be used.

We are aware that threaded jaws have already been used in chucks, together with adjusting-screws; but such chucks were without the threaded socket $b$ and without the binding nut $g$, and could therefore not be locked to prevent the jaws from working loose during the jarring of the machinery.

We claim—

In a chuck, the combination of the centrally-perforated body $a$, having inclined channels $f$ and annular recess at the back, and threaded socket $b$, with the conical annular screw $d$, fitted into said annular recess, the jaws $m$, having projecting biting-pieces $m'$, and the binding-nut $g$, screwed onto the socket $b$, substantially as herein shown and described.

CHARLES CROISSANT.
PIERRE PHILIPPE HURÉ.

Witnesses:
 A. BLÉTRY,
 ACT. JOLLET.